(12) United States Patent
Wilson

(10) Patent No.: US 7,593,593 B2
(45) Date of Patent: Sep. 22, 2009

(54) METHOD AND SYSTEM FOR REDUCING EFFECTS OF UNDESIRED SIGNALS IN AN INFRARED IMAGING SYSTEM

(75) Inventor: Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 10/870,777

(22) Filed: Jun. 16, 2004

(65) Prior Publication Data

US 2005/0281475 A1    Dec. 22, 2005

(51) Int. Cl.
*G06K 9/40*       (2006.01)
*H04N 5/217*   (2006.01)

(52) U.S. Cl. ...................................... 382/275; 348/241

(58) Field of Classification Search ................. 382/254; 348/241, 102, 162
See application file for complete search history.

(56) References Cited

U.S. PATENT DOCUMENTS

| | | | |
|---|---|---|---|
| 4,992,650 A | 2/1991 | Somerville | 235/462 |
| 5,319,214 A | 6/1994 | Gregory | |
| 5,436,639 A | 7/1995 | Arai | |
| 5,483,261 A | 1/1996 | Yasutake | |
| 5,526,177 A | 6/1996 | Fantone | |
| 5,528,263 A | 6/1996 | Platzker | |
| 5,821,930 A | 10/1998 | Hansen | |
| 5,831,601 A | 11/1998 | Vogeley | |
| 5,835,692 A | 11/1998 | Cragun | |
| 5,900,863 A | 5/1999 | Numazaki | |
| 5,920,688 A | 7/1999 | Cooper | |
| 5,940,076 A | 8/1999 | Sommers | |
| 5,973,315 A | 10/1999 | Saldana | |
| 6,128,003 A | 10/2000 | Smith | |
| 6,154,214 A | 11/2000 | Uyehara | |

(Continued)

FOREIGN PATENT DOCUMENTS

EP        0690407        1/1996

(Continued)

OTHER PUBLICATIONS

Kijima, Ryugo, et al. "Distributed Display Approach Using PHMD with Infrared Camera", Proceedings of the IEEE Virtual Reality, Orlando, Florida, Mar. 24-28, 2002. pp. 1-8.

(Continued)

*Primary Examiner*—John Strege
(74) *Attorney, Agent, or Firm*—Workman Nydegger

(57) ABSTRACT

Effects of undesired infrared light are reduced in an imaging system using an infrared light source. The desired infrared light source is activated and a first set of imaging data is captured during a first image capture interval. The desired infrared light source is then deactivated, and a second set of image data is captured during a second image capture interval. A composite set of image data is then generated by subtracting from first values in the first set of image data corresponding second values in the second set of image data. The composite set of image data thus includes a set of imaging where data all infrared signals are collected, including both signals resulting from the IR source and other IR signals, from which is subtracted imaging in which no signals result from the IR course, leaving image data including signals resulting only from the IR source.

10 Claims, 6 Drawing Sheets

U.S. PATENT DOCUMENTS

| | | | |
|---|---|---|---|
| 6,266,061 B1 | 7/2001 | Doi | |
| 6,340,119 B2 | 1/2002 | He | |
| 6,448,987 B1 | 9/2002 | Easty | |
| 6,469,722 B1 | 10/2002 | Kinoe | |
| 6,476,378 B2 | 11/2002 | Nougaret | |
| 6,520,648 B2 | 2/2003 | Stark | |
| 6,522,395 B1 | 2/2003 | Bamji et al. | 356/5.01 |
| 6,529,183 B1 | 3/2003 | MacLean | |
| 6,545,663 B1 | 4/2003 | Arbter | |
| 6,614,422 B1 | 9/2003 | Rafii | |
| 6,654,007 B2 | 11/2003 | Ito | |
| 6,690,363 B2 | 2/2004 | Newton | |
| 6,710,770 B2 | 3/2004 | Tomasi | |
| 6,720,949 B1 | 4/2004 | Pryor | |
| 6,750,877 B2 | 6/2004 | Rosenberg | |
| 6,781,069 B2 | 8/2004 | Silverstein | |
| 6,788,813 B2 | 9/2004 | Cooper | |
| 6,791,530 B2 | 9/2004 | Vernier | |
| 6,812,907 B1 | 11/2004 | Gennetten | |
| 6,840,627 B2 | 1/2005 | Olbrich | |
| 6,959,102 B2* | 10/2005 | Peck | 382/103 |
| 7,075,687 B2 | 7/2006 | Lippert | |
| 7,084,859 B1 | 8/2006 | Pryor | |
| 7,120,280 B2 | 10/2006 | Biswas | |
| 7,161,578 B1 | 1/2007 | Schneider | |
| 7,268,774 B2 | 9/2007 | Pittel | |
| 7,310,085 B2 | 12/2007 | Holloway | |
| 7,404,146 B2 | 7/2008 | Bennetts | |
| 7,418,671 B2 | 8/2008 | Hama | |
| 2001/0012001 A1* | 8/2001 | Rekimoto et al. | 345/173 |
| 2003/0161524 A1 | 8/2003 | King | 382/141 |
| 2004/0005920 A1 | 1/2004 | Soltys | |
| 2004/0090524 A1* | 5/2004 | Belliveau | 348/102 |
| 2004/0196371 A1* | 10/2004 | Kono et al. | 348/162 |
| 2005/0006786 A1 | 1/2005 | Mine | |
| 2005/0050476 A1 | 3/2005 | SanGiovanni | |
| 2005/0122306 A1 | 6/2005 | Bell | |
| 2005/0122308 A1 | 6/2005 | Bell | |
| 2005/0226467 A1 | 10/2005 | Hatano | |
| 2005/0226505 A1 | 10/2005 | Wilson | |
| 2005/0227217 A1 | 10/2005 | Wilson | |
| 2005/0245302 A1 | 11/2005 | Bathiche | |
| 2005/0277071 A1* | 12/2005 | Yee | 430/396 |
| 2006/0010400 A1 | 1/2006 | Dehlin | |
| 2006/0034492 A1 | 2/2006 | Siegel | |
| 2006/0056662 A1 | 3/2006 | Thieme | |
| 2006/0092170 A1 | 5/2006 | Bathiche | |
| 2006/0244719 A1 | 11/2006 | Brigham | |
| 2006/0289760 A1 | 12/2006 | Bathiche | |
| 2007/0063981 A1 | 3/2007 | Galyean | |
| 2007/0126717 A1 | 6/2007 | Cohen | |
| 2007/0157095 A1 | 7/2007 | Bilow et al. | |
| 2007/0279494 A1 | 12/2007 | Aman | |

FOREIGN PATENT DOCUMENTS

| | | |
|---|---|---|
| FR | 27656077 | 5/1998 |
| WO | 9819292 | 5/1998 |

OTHER PUBLICATIONS

Pavlidis, Ioannis, et al. "A Vehicle Occupant Counting System Based on Near-Infrared Phenomenology and Fuzzy Neural Classification", IEEE Transactions on Intelligent Transportation System, New York, NY, vol. 1, No. 2., Jun. 2000, pp. 78-80.

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1,2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." Proceedings of Siggraph '93 (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." UIST '01 Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." ACM UIST2002 demonstration, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." ACM CSCW 2002: Workshop on Co-located Tabletop Collaboration: Technologies and Directions. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." Proceedings of CHI '97, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." Proceedings of CHI '99, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." Extended Abstracts of CHI 2001, Seattle. Apr. 2001. pp. 269-270.

Kang, Sing Bing. "Radial Distortion Snakes." IAPR Workshop on Machine Vision Applications (MVA2000), Tokyo, Japan. Nov. 2000. pp. 603-606.

Kato, Billinghurst, Poupyrev, Imamoto, and Tachibana. "Virtual Object Manipulation on a Table-Top AR Environment." IEEE and ACM Int'l Symposium on Augmented Reality 2000, ISAR'2000, Oct. 5-6, 2000, Munich. 9pp.

Klemmer, Newman, and Sapien. "The Designer's Outpost: A Task-Centered Tangible Interface for Web. Site Information Design." Proceedings of Human Factors in Computing Systems: CHI 2000 Extended Abstracts. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001.* 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitbuishi Electric Research Laboratories, Cambridge, Massachusetts, USA. Undated. 2pp.

Magerkurth, Stenzel, and Prante. "Stars—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Satoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York Unviersity mrl. NYU Media Research Lab. Available http://cat.nyu.edu/PMD. Printed May 16, 2004. 3pp.

Rovani, David (Posted by). "My Second Month with the Compaq Tablet." *Home>Reviews*, TablePCHome.com—*Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedinngs of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Diaplays." *UIST '03*, Vancouver, B.C., Canada. © 2003 ACM 1-58113-636-6/03/0010. pp. 193-202.

Office Action mailed Jun. 29, 2007 cited in related U.S. Appl. No. 10/834,675.

Hardenberg Von. Christian, "Fingertracking and Handposture Recognition for Real-Tim Human-Computer Interaction", Berlin, Jul. 20, 2001.

Office Action mailed Dec. 13, 2007 cited in related U.S. Appl. No. 10/834,675.

Office Action mailed Oct. 9, 2007 cited in related U.S. Appl. No. 10/867,434.

"The Tracking Cube: a Three Dimensional Input Device" IBM Techincal Disclosure Bulletin, IBM Corp. New York, US, vol. 32, No. 3B; Aug. 1, 1989, pp. 91-95.

Norlhop Grumman "TouchTable ™" Brochure O2005 Northop Grumman Space & Mission Systems Corp. RS1190705. 2pp.

Department of Defence, Department of Defence Logistics Automatic Indentfification Technology Handbook for Product and Shipping Label Quality Assurance, Feb. 15, 2000, p. 14, Section 3.3.3.6, http://www.dodait.com/conf/data1199/printquality/print0111r6.doc.

Notice of Allowance dated Apr. 23, 2008 cited in related U.S. Appl. No. 10/969,746.

Office Action dated Jun. 12, 2008 cited in related U.S. Appl. No. 11/117,979.

Office Action dated Oct. 9, 2007 cited in related U.S. Appl. No. 10/813,855.

Office Action dated May 7, 2008 cited in related U.S. Appl. No. 10/813,855.

Related Patent U.S. Appl. No. 12/106,910 Filed Apr. 21, 2008.

Related Patent U.S. Appl. No. 12/110,032 Filed Apr. 25, 2008.

Office Action dated Mar. 25, 2008 cited in related U.S. Appl. No. 10/880,167.

Notice of Allowance mailed Feb. 27, 2008 Cited in related U.S. Appl. No. 10/814,761.

Notice of Allowance dated Mar. 28, 2008 cited in related U.S. Appl. No. 10/834,675.

Office Action dated Jun. 26, 2008 cited in related U.S. Appl. No. 11/364,319.

Office Action dated Jul. 10, 2008 cited in U.S. Appl. No. 10/867,434.

Office Action dated Feb. 8, 2008 cited in U.S. Appl. No. 11/321,551.

Office Action dated Aug. 19, 2008 cited in U.S. Appl. No. 11/321,551.

Notice of Allowance dated Oct. 16, 2007 cited in U.S. Appl. No. 10/814,761.

Office Action dated Sep. 2, 2008 cited in U.S. Appl. No. 11/170,234.

Notice of Allowance dated Sep. 11, 2008 cited in U.S. Appl. No. 11/117,979.

Notice of Allowance dated 11/14/08 cited in U.S. Appl. No. 11/117,979.

Office Action dated 11/28108 cited in U.S. Appl. No. 10/867,434.

Notice of Allowance dated 12/31/08 Cited in U.S. Appl. No. 11/364,319.

Notice of Allowance dated Dec. 31, 2008 cited in U.S. Appl. No. 10/880,167.

Notice of Allowance dated Jan. 12, 2009 cited in U.S. Appl. No. 11/170,234.

Office Action dated Jan. 26, 2009 cited in U.S. Appl. No. 11/321,551.

Office Action dated Feb. 19, 2009 cited in U.S. Appl. No. 10/813,855.

Notice of Allowance dated Mar. 11, 2009 Cited in U.S. Appl. No. 10/969,746.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans Peter Seidel; "A Framework for the Acquisition, processing, Transmission, and Interactive Display of High Quality 3D Models on the Web" Research Report, MaxPlanck-Institute, May 2001; Sections 5 and 8.

Notice of Allowance dated Oct. 8, 2008 cited in U.S. Appl. No. 10/880,167.

Notice of Allowance Dated Oct. 17, 2008 cited in U.S. Appl. No. 10/969,746.

Office Action dated Oct. 7, 2008 cited in U.S. Appl. No. 11/218,171.

Office Action dated Oct. 30, 2008 cited in U.S. Appl. No. 12/106,910.

* cited by examiner

METHOD AND SYSTEM FOR REDUCING EFFECTS OF UNDESIRED SIGNALS IN AN INFRARED IMAGING SYSTEM

FIELD OF THE INVENTION

The present invention generally pertains to active infrared (IR) imaging, and more specifically, to removing IR signals received from unintended and undesired IR sources in a region of interest to improve the quality of imaging data resulting from the active IR source.

BACKGROUND OF THE INVENTION

The presence of undesired signals is a concern in the processing of virtually all electromagnetic signals. Even in a relatively simple system, such as a radio, a squelch control is often provided to attenuate signals below a certain magnitude, so as to avoid undesired background static being audible when a signal of interest is not being received. What constitutes undesired background static is for the user to judge, and the user can set the squelch control to limit the audibility of received signals based on the user's judgment.

Automated signal processing systems, where a computer system autonomously responds to input signals, present a more difficult problem. Unlike the example of a squelch control noted above, where a user can adjust the squelch level based on experience and judgment, it is more difficult to program a computer system to automatically set a limit to differentiate between types of signals that are desirable and those that are not. For example, computers respond well to unambiguous input from keyboards, pointing devices, and similar input devices, but respond less satisfactorily to voice commands. Anyone who has used speech recognition programs has experienced some difficulty when the computer fails to recognize something the user said, which happens more often if there is any background noise or other sounds that affect the auditory input perceived by the computer.

Computer vision arguably is a much more intricate problem than speech recognition. If the computer must process too many visual signals or too broad a range of visual signals, the input will more likely be misread by the computer. On the other hand, if the computer suppresses too many visual signals, the computer also may misread visual inputs or ignore intended visual inputs entirely.

Today, computer vision is becoming an increasingly important field in furthering the desire to make computers and their interfaces even more user friendly. For example, the MIT Media. Lab, as reported by Brygg Ullmer and Hiroshi Ishii in "The metaDESK: Models and Prototypes for Tangible User Interfaces," *Proceedings of UIST* 10/1997:14-17," has developed another form of "keyboardless" human-machine interface. The metaDESK includes a generally planar graphical surface that not only displays computing system text and graphic output, but also receives user input by "seeing" and responding to an object placed against the graphical surface. The combined object responsive and display capability of the graphical surface of the metaDESK is facilitated using IR lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface. By "seeing" and detecting a specially formed object or IR-reflected light from an object disposed on a graphical display surface, the metaDESK can respond to the contemporaneous placement and movement of the object on the display surface to carryout a predefined function, such as displaying and moving a map of the MIT campus.

Others have been developing similar keyboardless interfaces. For example, papers published by Jun Rekimoto of the Sony Computer Science Laboratory, Inc., and associates describe a "HoloWall" and a "HoloTable" that display images on a surface and use IR light to detect objects positioned adjacent to the surface.

Both the metaDESK and HoloWall/HoloTable use IR light to see objects and movements for good reasons. If the systems responded to visible light, visible light projected by the systems and reflected back by the interactive surface could lead to false readings by the computing system. Further, even if reflections could be suppressed, unless the system is disposed in a dark room, room lights and other visible light passing through the interactive display surface would substantially adversely affect the computer vision systems.

Using reflected IR light to detect objects placed on an interactive display surface avoids much of the problems that would arise from attempting to recognize the objects with ubiquitous visible light. However, although people are generally aware of the IR content of light produced by most sources, because it is not visible to the naked eye, ambient IR light signals that might adversely impact computer vision systems also are very common. Incandescent lights, the sun, and a variety of other common sources generate IR light. These unintended IR signals, just like unintended visible light signals, can provide undesired input to IR-sensitive computer vision systems. Band-pass type filters can suppress visible light and other non-IR light, but they are not helpful in separating IR light reflected from an object that is to be detected from background IR light.

It is therefore desirable to filter, mask, or otherwise reduce the effects of unintended and undesired IR light signals, to prevent IR light vision systems from responding to extraneous IR light signals. The effect of the undesirable background IR light should be avoided when detecting objects without requiring that an IR computer vision system be operated in an environment that shields it from all background IR sources.

SUMMARY OF THE INVENTION

One of the more important functions of the present invention is to reduce the effects of undesired IR sources, including ambient sources such as sunlight, incandescent light, and other IR sources, in an IR imaging system. Imaging data are captured both when the IR source controlled by the IR imaging system is activated and when it is not. The imaging data collected when the controlled IR source is deactivated are imaging data based on undesired IR sources. Thus, by pixel-wise subtracting a set of imaging data collected when the IR source was deactivated, from a set of imaging data collected when the IR source was activated, the resulting composite set of imaging data should include only imaging data resulting from illumination generated by the controlled IR source.

One aspect of the present invention is thus directed to a method for reducing effects of undesired IR light sources in an imaging system using an IR light source. The IR light source is activated during a first image capture interval, and a first set of imaging data is captured during the first image capture interval. The IR light source is then deactivated, and a second set of image data is captured during the second image capture interval. A composite set of image data is then generated by subtracting from first values in the first set of image data corresponding second values in the second set of image data.

In accordance with one embodiment of the present invention, activation of the IR light source is controlled by an image capture device, such that an image capture signal generated by the image capture device causes the IR light source to be activated during the first image capture interval and deactivated during the second image capture interval.

The IR light source is disposed on a first side of a light-permeable surface. As a result, the IR light source directs IR light on a physical object disposed adjacent an opposite side of the light-permeable surface. The image capture device, like the IR source, is disposed on the first side of a light-permeable surface and is used to capture IR light cast by the IR light source that has been reflected by the physical object.

The image processing system uses the light reflected by the physical object in the composite set of image data to recognize a characteristic of the physical object. In this method, the first values in the first set of image data represent an intensity of IR light captured for each of a plurality of points across the first side of the light-permeable surface during the first image capture interval, while the IR light source was activated. The second values in the set of image data represent an intensity of IR light captured for each of the plurality of points across the first side of the light-permeable surface during the second image capture interval, while the IR light source was deactivated.

In one embodiment of the present invention, the composite image data are determined by the equation:

$$D(x,y) = I_{ON}(x,y) - I_{OFF}(x,y)$$

where:
- x,y represents a coordinate location of a point on the first side of the light-permeable surface;
- $I_{ON}(x,y)$ represents intensity of IR light detected during the first image capture interval at point x,y;
- $I_{OFF}(x,y)$ represents intensity of IR light detected during the second image capture interval at point x,y; and
- $D(x,y)$ represents the net intensity of IR light at point x,y when the intensity of the IR light captured at the point x,y during the second image capture interval is subtracted from the intensity of the IR light captured at the point x,y during the first image capture interval.

The composite set of image data generated is provided to an image processing system. There, the IR light reflected by the physical object is used to recognize a characteristic of the physical object. Furthermore, a projector is preferably positioned on the first side of the light-permeable surface and is usable to present images on the opposite side of the light-permeable surface. A physical object on the opposite side of the light-permeable surface can thus interact with an image presented thereon.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4A:
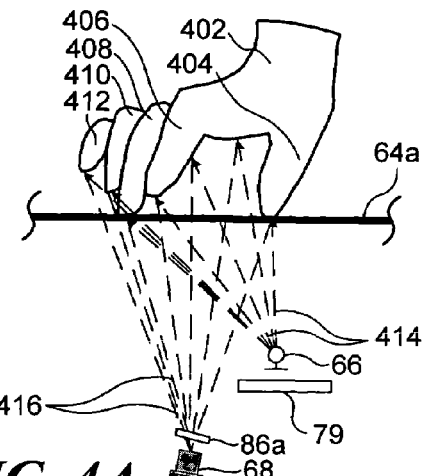
Figure 4B:
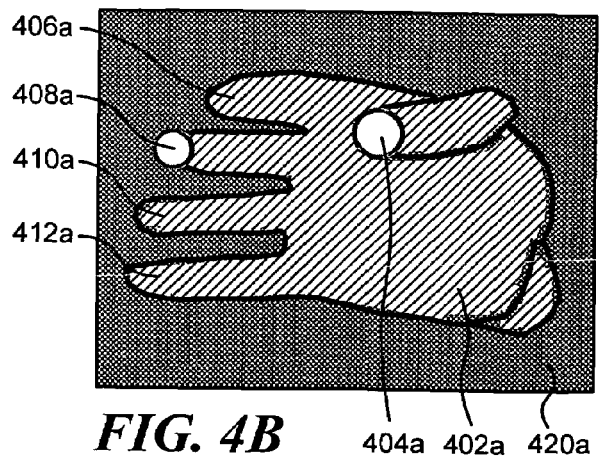
Figure 4C:
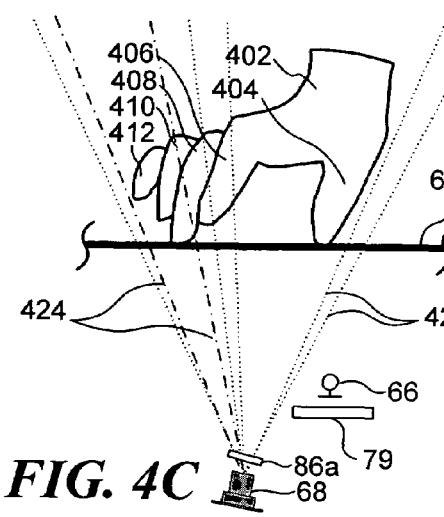
Figure 4D:
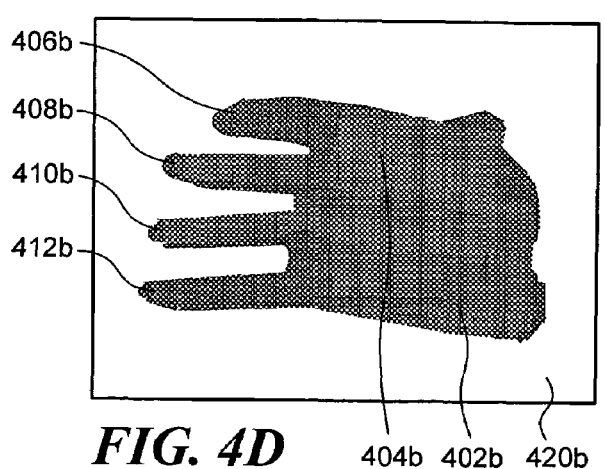
Figure 4E:
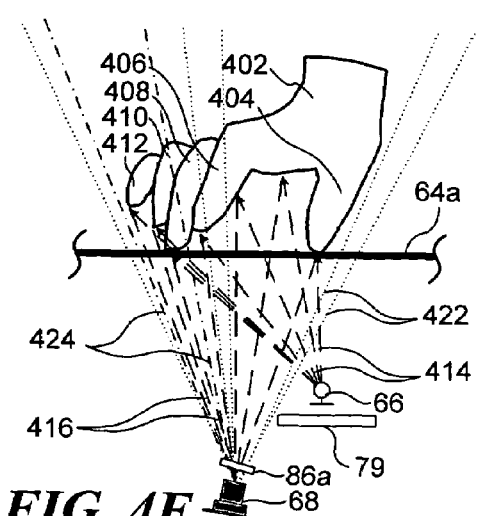
Figure 4F:
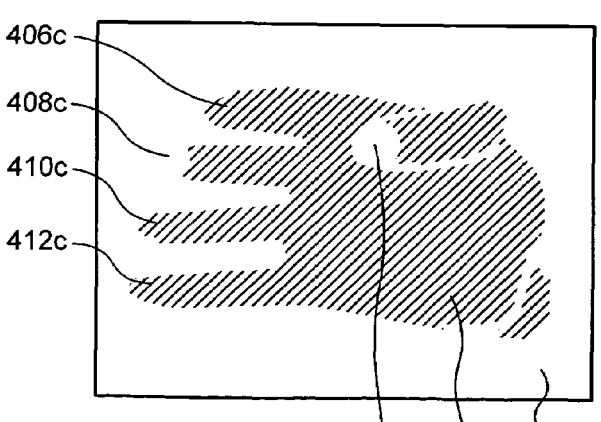
Figure 5:
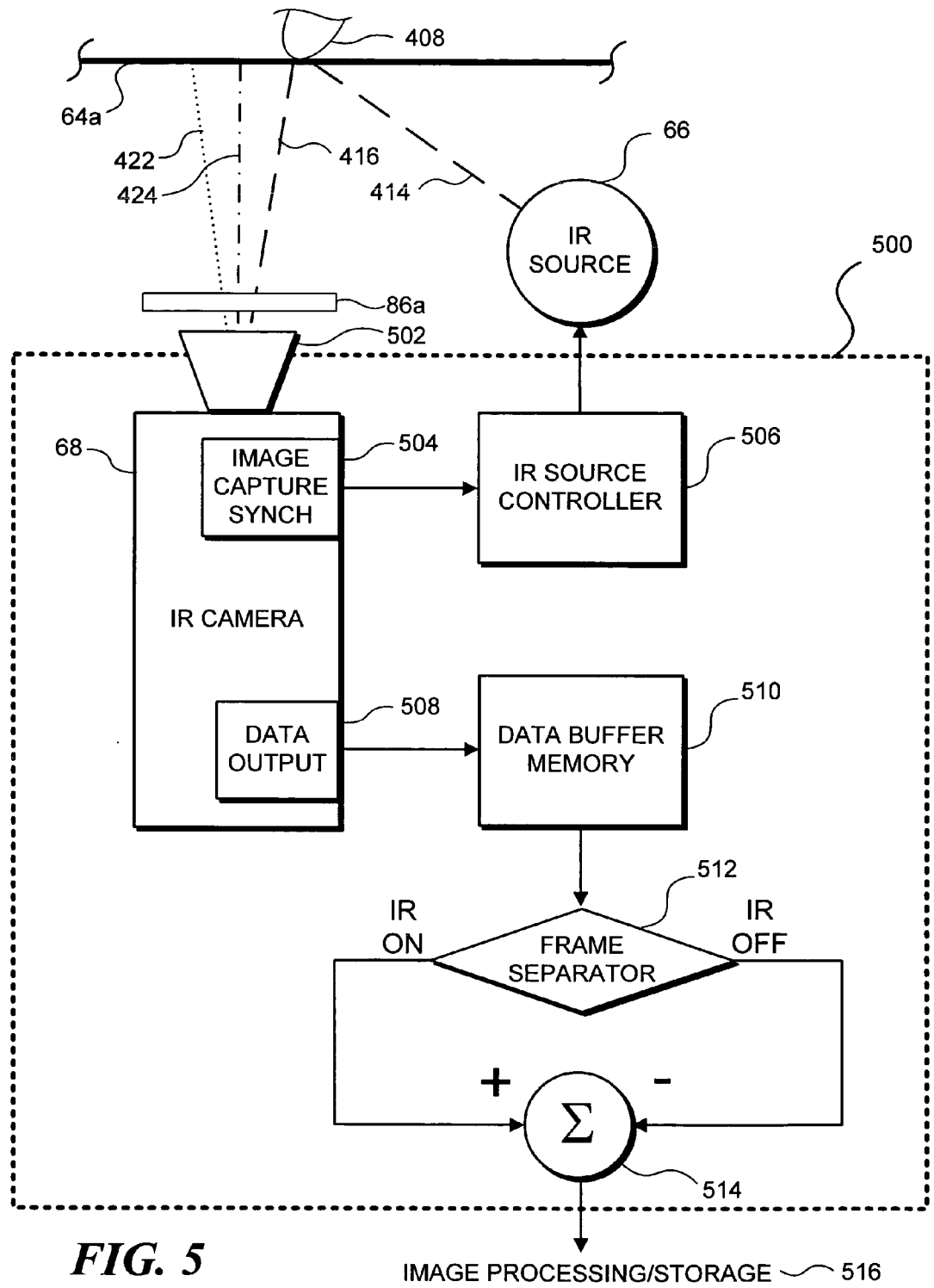
Figure 6:
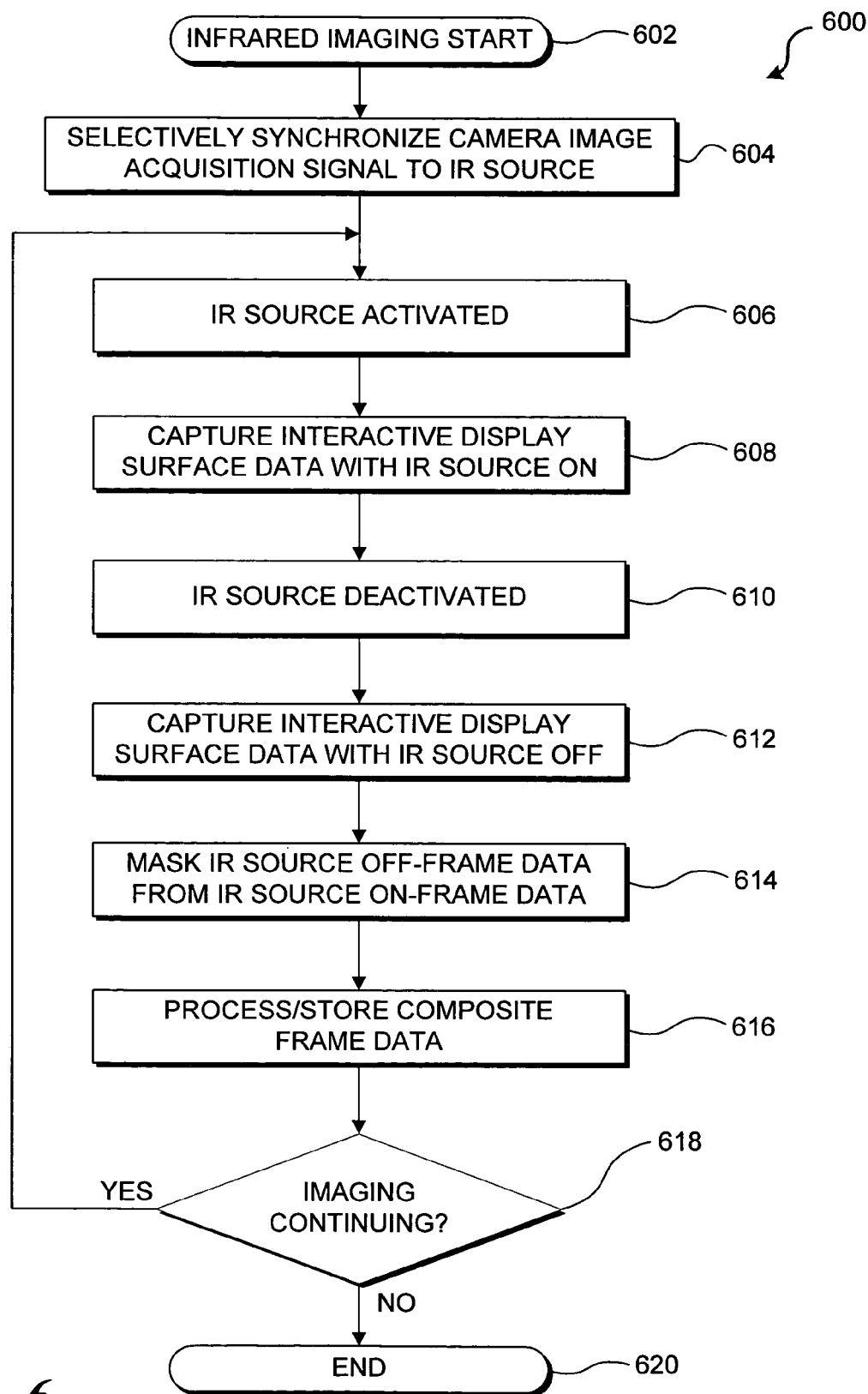

FIGS. 4A, 4C, and 4E each show an enlarged cross-sectional view of a portion of the display surface, with a hand adjacent to the display surface illuminated by IR light from a controlled IR source and/or ambient IR light, while FIGS. 4B, 4D, and 4F show resulting images captured from the display surface based upon reflected IR light from the hand;

FIG. 5 is a block diagram of a system for reducing the effect of undesired IR sources according to an embodiment of the present invention; and FIG. 6 is a flow diagram illustrating the logical steps for reducing the effect of undesired IR illumination according to an embodiment of the present invention.

DESCRIPTION OF THE PREFERRED EMBODIMENT

Exemplary Computing System for Implementing Present Invention

Figure 1:
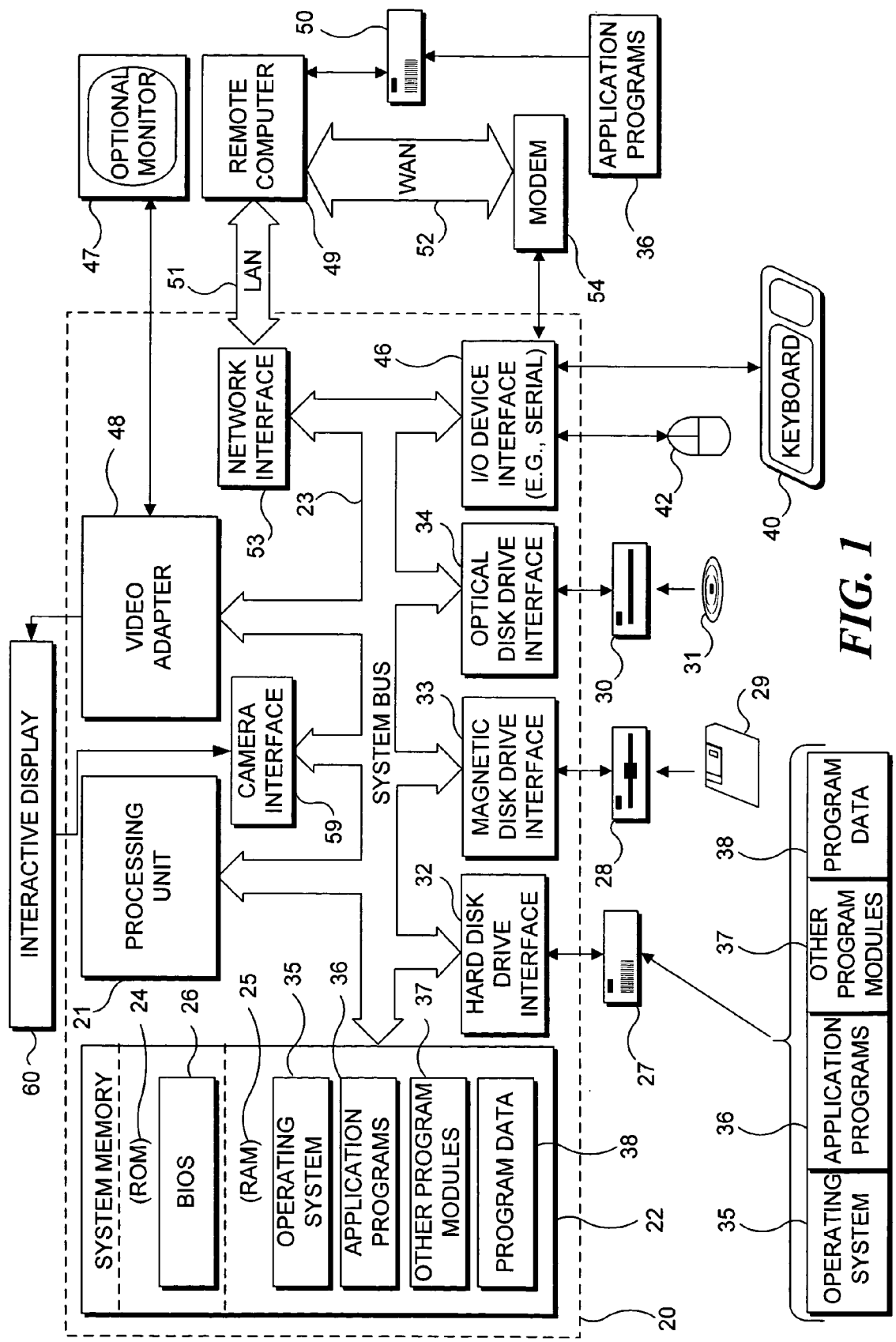
FIG. 1 is a functional block diagram of a generally conventional computing device or personal computer (PC) that is suitable for image processing for the interactive display surface as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
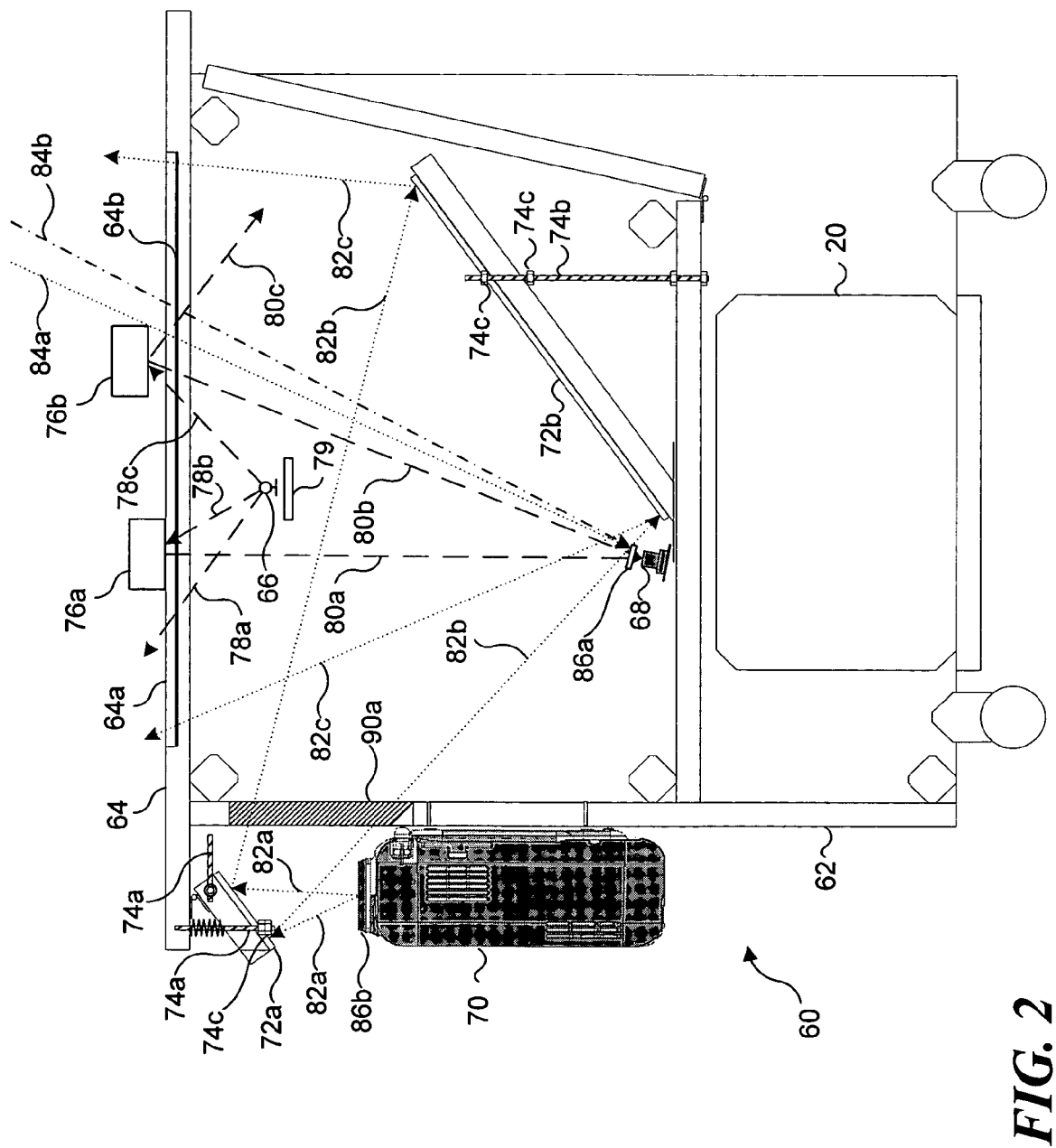
FIG. 2 is a cross-sectional view of a table-type interactive display surface, illustrating internal components.

In FIG. 2, an exemplary interactive display table 60 is shown that includes PC 20 within a frame 62 and which serves as both an optical input and video display device for the computer. In this cut-away Fig. of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
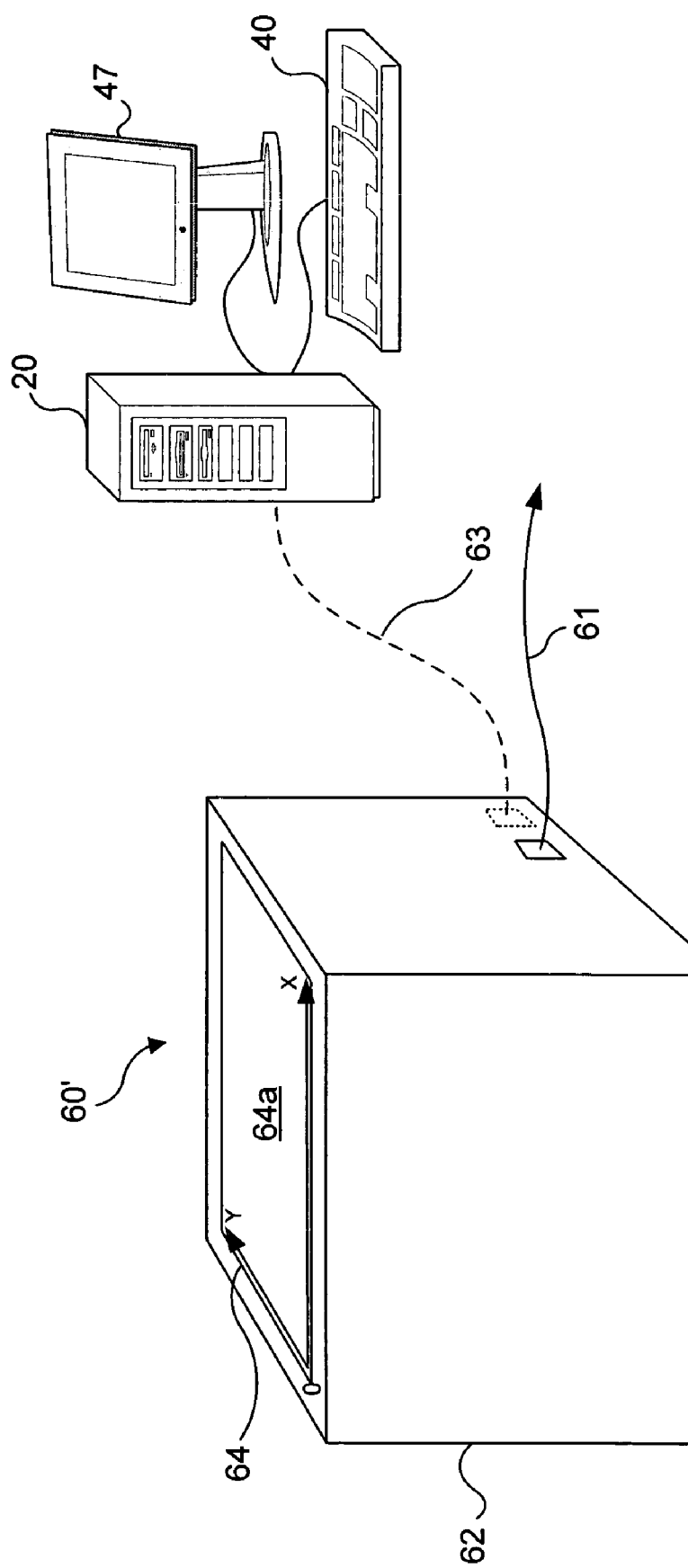
FIG. 3 is an isometric view of an embodiment of the table-type interactive display surface that is coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as an object 76a, or are hovering just above it, such as an object 76b. It is the ability of the interactive display table to visually detect such objects, as well as the user's finger or other object being moved by the user that greatly facilitates this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCOS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

IR Images Captured With and Without a Controlled IR Source

Although interactive display table 60 (FIG. 2) employs an IR pass filter 86a, this filter only excludes non-IR light from reaching the IR video camera. Extraneous IR light signals also should be limited or compensated to prevent these undesired signals from interfering with the functioning of the interactive display table 60. FIGS. 4A-4F show a portion of an interactive display table to illustrate how unintended IR signals can distort an IR-spectrum image of a user's hand 402 engaging an interactive surface 64a.

FIG. 4A shows user's hand 402 partially touching and partially "hovering" over display surface 64a. An IR imaging system can respond to and differentiate between physical objects touching the interactive display surface and physical objects hovering proximate to the display surface, as described in commonly assigned, co-pending U.S. patent application Ser. No. 10/814,761, entitled "Determining Connectedness And Offset Of 3D Objects Relative To An Interactive Surface," which was filed on Mar. 31, 2004, the specification and drawings of which are hereby specifically incorporated herein by reference.

More particularly, in FIGS. 4A, 4C, and 4E, thumb 404 and middle finger 408 of user's hand 402 are touching interactive display surface 64a, while index finger 406 and ring finger 410 "hover" a short distance above interactive display surface 64a, and little finger 412 hovers slightly further away from interactive display surface 64a.

In FIG. 4A, beams of IR light 414 emanating from IR light source 66 pass through interactive display surface 64a and are incident on user's hand 402. Beams of reflected IR light 416 pass back through interactive display surface 64a, continuing through IR band pass filter 86a and into IR video camera 68. The IR video camera produces a signal corresponding to an image of the IR light entering the camera. This image is a function of IR light beams 416 and any other IR light that reach the IR video camera. In FIG. 4A, the only source of IR light is IR source 66; there are no unintended ambient or extraneous IR light sources in FIG. 4A. Baffle 79 prevents IR light from IR source 66 from directly entering the lens of IR video camera 68.

FIG. 4B shows the resulting IR-image of user's hand 402a produced by IR video camera 68 in response only to beams of IR light 416 for IR source 66 that are reflected by user's hand 402. In response to beams of reflected IR light 416, user's hand 402a has a greater intensity or brightness than that of the background 420a in this image. Further, tips of thumb 404a and middle finger 408a have a greater intensity or brightness than the rest of fingers 406a, 410a, and 412a, and the rest of hand 402a, in the image. Tips of thumb 404a and middle finger 408a are the only parts of hand 402a touching display surface 64a (FIG. 4A), so that the IR light reflected from the tips of the thumb and middle finger suffers less reduction due to the diffusion of interactive display surface 64a and therefore have a greater intensity than the rest of hand 402a or background 420a. Although only two distinct intensity levels are shown in FIG. 4B, it will be appreciated, however, that the intensity of the reflected IR light will vary based on the reflectivity of a physical object and its distance from interactive display surface 64a.

In FIG. 4C, IR source 66 is deactivated. Thus, unlike the illustration in FIG. 4A, beams of IR light 414 are not projected toward user's hand 402, and there are no beams of IR light 416 reflected from the user's hand toward IR video camera 68. However, unlike the illustration of FIG. 4A, FIG. 4C shows beams of IR light 422 and 424 originating beyond interactive display surface 64a, which are captured by IR video camera 68. For example, IR beams 422 might represent IR light emanating from any incandescent light source in the ambient environment of the interactive display table, and IR beams 424 might represent beams of IR light included in sunlight illuminating the ambient environment through a window (not shown). Beams of IR light 422 and 424 pass around user's hand 402 and between user's fingers 404-412, continuing through IR band pass filter 86a. The "backlighting" of user's hand 402 therefore results in an image that includes a shadow of user's hand 402 against a brighter background 420b, as shown in FIG. 4D.

In FIG. 4D, user's hand 402 is dark —not bright and illuminated as in FIG. 4B. IR light coming only from behind user's hand 402 appears much brighter than the user's hand in this image, so that the user's hand appears only as a shadow against brighter background 420b. The image of FIG. 4D is understandably like that of a person standing with the sun behind the person, so that the person is backlit by the sun. The diffuse rays of backlighting result in a rather homogeneous shadowy image of the person against a much brighter background. As can be seen in FIG. 4D, there is no distinction between the images of finger tips of thumb 404b and middle finger 408b and the rest of the image of hand 402b and fingers 406b, 410b, and 412b as there is in FIG. 4B. Thus, the backlighting of user's hand with ambient IR light, at a minimum, tends to reduce the contrast between touching and hovering digits and hand, and may substantially reduce the useful image processing of an image that includes user's hand 402. In general, any segmentation of the image, i.e., labeling each pixel as being part of the user's hand or not, or any pixel as part of an object placed on the interactive display surface or not is more difficult under these conditions. The ambient light levels can easily match those of the reflected IR light from the IR light source. In general, it is possible to read the surface appearance of any object (since the ambient light does not impact the light returned from objects if they are opaque), then it is not possible to rely on contours and shapes, or on the absolute pixel intensities in an image as an indication of what object is in contact with the interactive display surface.

In FIG. 4E, IR source 66 is once again activated as in FIG. 4A. This time, however, ambient IR sources are also active, so that, for example, ambient IR light from incandescent light 422 and sunlight 424 are also present. As shown in FIG. 4E, projected beams of IR light 414 reach user's hand 402 and fingers 404-412 from IR source 66, and reflected beams of IR light 416 from the hand and fingers reach IR video camera 68. At the same time, ambient IR light 422 and 424, shining around user's hand 402 and through user's fingers 404-412, also reaches the IR video camera. Again, none of beams 416, 422, and 424 are blocked by IR band pass filter 86a.

The resulting image of FIG. 4F shows that IR light beams 416 reflected from the user's hand and ambient IR light beams 422 and 424 may effectively offset each other. As a result, contrast may be substantially reduced, not only between the tips of user's fingers 404c and 408c touching interactive display 64a and the rest of user's hand 402c and fingers 406c, 410c, and 412c, but in general, between user's hand 402c and fingers 404c-412c, and background 420c. Background 420c will be bright as in FIG. 4D, and the user's fingers 404c and 408c will be discernible, due to the reflected IR from the IR light source. Also, user's hand 402c will be evident as a shadow relative to the bright ambient background. If beams of reflected IR light 416 from the user's hand are of substantially greater intensity than the beams of ambient IR light 422 and 424, the image of user's hand 402c and fingers 404c-412c still might stand out as brighter than background 420c. Active adjustment of the intensity of IR source 66 would have to be made to account for beams of ambient light 422 and 424 while attempting to preserve contrast between of the tips of fingers 404c and 408c that are touching interactive display surface 64a and the background illuminated by ambient IR light beams 422 and 424.

Accordingly, the present invention compensates for the effects of undesired and/or unintended ambient sources of IR light such as external incandescent light 422 and sunlight 424 by creating a composite set of imaging data from which the ambient sources of IR light are substantially removed. Again referring to FIGS. 4B, 4D, and 4E, what is desired is to achieve the equivalent of the image of FIG. 4B, where only reflected beams of IR light 416 (FIG. 4A) are received at IR video camera 68. Unfortunately, except by substantially eliminating most of the ambient IR light in the environment, external sources of IR light 422 and 424 will typically be included, along with reflected beams of IR light 416, resulting in an image more like that of FIG. 4F unless the presence of the ambient IR light is compensated. Without providing appropriate compensation, whenever there are ambient IR sources present in the environment, the undesired background in the image of FIG. 4D will always be added to the desired image of IR light reflected from objects as in FIG. 4B, yielding an image with the problems of FIG. 4F.

While the image of FIG. 4B cannot be naturally captured excepted in an isolated setting, the environments of FIGS. 4C and 4E can be selectively achieved in a typical setting. FIG. 4C shows an environment in which extraneous IR light beams 422 and 424 produce the image of FIG. 4D, which can be captured when IR source 66 is deactivated. FIG. 4E shows a typical environment that includes both reflected IR light beams 416 (when IR source 66 is activated) and extraneous IR light beams 422 and 424. Thus, the image of FIG. 4F can be captured when IR source 66 is selectively activated in the presence of extraneous IR light. Since the image of FIG. 4F is the compilation of the image resulting from desired reflected IR light of FIG. 4B and the image resulting from undesired extraneous IR light of FIG. 4D, subtracting the image of FIG. 4D from the image of FIG. 4F should yield the image of FIG. 4B, thereby compensating for the extraneous or ambient IR light.

Thus, the desired image generally like that of FIG. 4B can be achieved in a typical environment by collecting two sets of image data. A first set of image data is collected with IR source 66 activated and with any existing ambient or extraneous IR sources present. A second set of image data is also collected with IR source 66 deactivated. The second set of image data collected is then subtracted pixel by pixel from the first set of image data, yielding a compensated set of image data that includes only reflected IR light beams generated by the IR source; the extraneous sources are effectively excluded. Ideally, the first and second sets of image data are collected rapidly and sequentially to, as closely as possible, provide differently illuminated images of the same conditions on the interactive display surface.

A preferred embodiment of the present invention does not attempt to reduce the effect of unintended IR sources based upon static ambient IR measurements or an initial calibration. Accordingly, at the commencement of image acquisition by the IR video camera, there is no delay for image calibration. In addition, the present invention adapts better to changes in ambient IR sources and light levels than a static calibration or compensation method can. For example, if a user were asked to remove physical objects from the interactive display surface for image calibration then directed to continue using the interactive display surface, the calibration data would not take into account how the presence of physical objects added to the interactive display surface after its calibration may block signals from ambient IR sources. The present invention, however, takes into consideration the IR shadows, such as that shown in FIG. 4D, which are caused by physical objects blocking ambient IR sources. Thus, the present invention generates image data presenting a greater IR contrast at such points than if the IR image captured with the IR source activated was compared to a static IR source image that was captured without the physical object present.

Furthermore, the present invention continually appropriately accounts for and responds to changes in ambient IR sources and IR light in the environment. As a result, changes in ambient IR sources, such as a room light being turned on or off, or the intensity of sunlight passing through a window changing because of variation in the weather, the passing of time changing sun angles, or a window shade being moved, do not hamper the effectiveness of the reduction of unintended IR sources by the present invention. Similarly, even more transient changes in light from ambient IR sources, for example, resulting from a person walking between the interactive display surface and a lamp or a window, are compensated by the present invention.

System for Generating Image Data to Reduce Effects of Undesired IR Sources

FIG. 5 shows a system 500 for generating composite imaging data in which the effects of undesired IR light sources are substantially compensated. System 500 works with interactive display surface 64a. PC 20 (shown in FIGS. 1-3) carries out the functions of image processing and includes a storage device 516. The PC processes the images produced by the IR video camera to detect the presence and/or movement of a user's finger 408 or other physical object disposed on or adjacent to the interactive display surface.

As previously described in connection with FIGS. 4A, 4C, and 4E, IR source 66 is selectively activated to direct IR light beams 414 toward interactive display surface 64a. Reflected IR light beams 416, as well as beams of ambient IR light from incandescent light 422 and sunlight 424 pass through interactive display surface 64a, continuing through IR band pass filter 86a and are detected by a sensor 502 in IR video camera 68.

IR video camera 68 includes an image capture synchronization output 504 that produces an image capture signal at the inception of each image capture interval. The image capture signal is received by an IR source controller 506, which activates IR source 66 at every other image capture interval. For example, if the frame rate of the IR video camera is X frames per second, the effective rate for activating IR source 68 is X/2 times per second. As a result, every other image frame captured by IR video camera 68 and conveyed as a signal from data output port 508 will include reflected IR beams 416 and ambient IR beams 422 and 424, while every alternative image frame will include only ambient IR beams 422 and 424. This approach is currently used in a preferred embodiment, but other approaches could instead be employed. The IR video camera and the IR source could be driven synchronously by PC 20, which could issue a command to activate or deactivate the IR source, and then immediately acquire a frame with the IR video camera. Or a special circuit could be provided to maintain the synchronization. In the embodiment discussed above, it is preferable to drive the IR video camera with a clock and simply synch from its output pulse, as a matter of convenience.

A typical video camera captures a total of 30 frames per second. Accordingly, 15 composite sets of imaging data are captured each second by combining 15 frames that are captured with IR source 66 activated with 15 frames that are captured with IR source 66 deactivated. It will be appreciated that higher frame rates are preferable. The more frames per second that are captured, the more accurately will the frames captured with IR source 66 activated and IR source 66 deactivated represent how objects appeared at interactive display surface 64a in time.

In one embodiment of the present invention, the images output through data output port 508 are stored in a data buffer memory 510. Each frame is tagged according to whether the frame was captured with the IR source on, or off. Tagging of frames is suitably accomplished by setting a flag to indicate whether the frames were captured with the IR source on or off. Alternatively, frames can be tagged if the IR source is activated only on odd—or only on even-numbered frames. In a current preferred embodiment, the intensity of a frame is evaluated by summing the pixel intensities over the image and comparing the sum of the intensities from one frame to the next. The frame with the greater sum of intensities is the "on" frame. Alternatively, it would be possible to place a white target at a known location on the underside of the apron surrounding interactive display surface 64a, so that by examining the pixel intensity in the known location, it can readily be determined if the IR source was active in a given frame.

From data buffer memory 510, frames are divided by a frame separator 512 that separates the frames as a function of whether the IR source was activated when a frame was captured. Frames for which the IR source was activated are routed to a positive side of a summer 514, while frames for which the IR source 66 was deactivated are routed to a negative side of summer 514, so that value for each point or pixel in each frame where the only IR illumination resulted from ambient IR sources can be subtracted from the corresponding value for that point or pixel where both IR source 66 was activated and ambient IR sources were present. Pixelwise subtracting the "IR source off" frames from the "IR source on" frames results in composite imaging data having IR values representing only the reflected IR light from IR source 66, substantially excluding the effect of ambient IR illumination.

More particularly, points of the respective images are pixelwise subtracted at summer 514 according to Eq. (1), as follows:

$$D(x,y)=I_{ON}(x,y)-I_{OFF}(x,y) \quad (1)$$

where:

x,y represents a coordinate location of a point on the interactive side of the light-permeable surface;

$I_{ON}(x,y)$ represents intensity of IR light detected during the first image capture interval at point x,y;

$I_{OFF}(x,y)$ represents intensity of IR light detected during the second image capture interval at point x,y; and $D(x,y)$ represents the net intensity of IR light at point x,y when the intensity of the IR light captured at the point x,y during the second image capture interval is subtracted from the intensity of the IR light captured at the point x,y during the first image capture interval.

Once the corresponding IR source 66 activated and IR source deactivated frame pairs are combined at summer 514, the composite set of imaging data generated is passed to image processing or storage, so that characteristics of one or more physical objects 408 present on or proximate to the interactive display surface can be processed and the results used by the interactive display system.

Method for Generating Image Data to Reduce Effects of Undesired IR Sources

FIG. 6 is a flow diagram 600 illustrating exemplary logical steps for substantially eliminating or reducing the effects of undesired IR illumination according to the present invention. At a step 602, IR imaging of the interactive display surface begins. At a step 604, the IR source is selectively synchronized with the image acquisition signal generated by the IR video camera (or other imaging device that might alternatively be used). Selective IR source synchronization is desired because, as previously explained, the IR source is activated only during every other image acquisition interval.

At a step 606, the IR source is activated. At a step 608, the interactive display surface is imaged with the IR source turned on. At a step 610, the IR source is deactivated, and at a step 612, the interactive display surface is imaged with the IR source turned off. Using the image frames captured at steps 608 and 612, at a step 614 the image data captured for pairs of frames under these two different lighting conditions are pixelwise combined, as previously described in connection with FIG. 5 and Eq. (1), to compensate for the effect of light from unintended IR sources. After the image data are combined at step 614 to generate the composite data, at a step 616, the composite data are used for image processing, such as to detect physical objects on or adjacent to the interactive display surface, or the data are stored for later processing.

At a decision step 618, it is determined if IR imaging data are continuing to be captured. If so, the flow diagram loops to step 606, where the selective activation and deactivation and image capture continues. On the other hand, if it is determined at decision step 618 that the IR imaging is complete, the flow diagram proceeds to a step 620 and ends.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for reducing an effect of an undesired infrared light source in an imaging system using a desired infrared light source and an image capture device that detecting emissions of both the undesired infrared light source and the desired infrared light source, the method comprising the steps of:

(a) positioning a desired infrared light source, an image capture device and a screening device, wherein the desired infrared light source, image capture device, and screening device are both positioned on a same, first side of a light permeable surface and in a manner that provides direct light communication between the light permeable surface with each of the desired infrared light source and the image capture device, the light permeable surface further having a second side on which one or more physical objects are detected, wherein the positioning includes positioning the infrared light source at a location closer to the light permeable surface than both the image capture device and the screening device, and positioning the screening device at a location closer to the light permeable surface than the image capture device, and wherein the screening substantially prevents any infrared light from the light source from entering the image capture device without first being directed to the light permeable surface;

(b) activating the desired infrared light source during a first image capture interval thereby causing the desired infrared light source to transmit infrared light at least partially through the light permeable surface;

(c) capturing, with the image capture device, a first set of image data during the first image capture interval, the first set of image data including image data of the one or more physical objects on the light permeable surface and which corresponds to both the desired infrared light source and an undesired infrared light source, the undesired infrared light source originating infrared light from a location on the second side of the light permeable surface;

(d) deactivating the desired infrared light source during a second image capture interval;

(e) capturing, with the image capture device, a second set of image data during the second image capture interval, the second set of image data corresponding to only the undesired infrared light source; and (f) producing a composite set of image data of the one or more physical objects located on the second surface by subtracting from first values in the first set of image data, corresponding second values in the second set of image data, the resulting composite set of image data including only image data resulting from illumination generated by the desired infrared light source, thereby reducing the effect of the undesired infrared light source by considering both desired and undesired infrared light sources.

2. The method of claim 1, further comprising the step of controlling activation of the desired infrared light source with an image capture device, such that an image capture signal generated by the image capture device causes the desired infrared light source to be activated during the first image capture interval and deactivated during the second image capture interval.

3. The method of claim 1, wherein the first values in the first set of image data represent an intensity of infrared light captured for a plurality of points across the first side of the light-permeable surface during the first image capture interval while the desired infrared light source was activated, and the second values in the set of image data represent an intensity of infrared light captured for the plurality of points across the first side of the light-permeable surface during the second image capture interval while the desired infrared light source was deactivated.

4. The method of claim 3, wherein the subtracting from the first values in the first set of image data corresponding second values in the second set of image data is defined by:

$$D(x,y)=I_{ON}(x,y)-I_{OFF}(x,y)$$

where:

(a) x,y represents a coordinate location of a point on the first side of the light-permeable surface;

(b) $I_{ON}(x,y)$ represents an intensity of infrared light detected during the first image capture interval at the point x,y;

(c) $I_{OFF}(x,y)$ represents an intensity of infrared light detected during the second image capture interval at the point x,y; and (d) D(x,y) represents a net intensity of infrared light at the point x,y when the intensity of the infrared light captured at the point x,y during the second image capture interval is subtracted from the intensity of the infrared light captured at the point x,y during the first image capture interval.

5. The method of claim 1, further comprising the step of communicating the composite set of image data to an image processing system.

6. The method of claim 5, further comprising the step of using the infrared light reflected by the physical object to recognize a characteristic of the physical object.

7. The method of claim 1, further comprising the step of positioning a projector on the first side of the light-permeable surface such that light from the projector directed onto the light-permeable surface is used to present images visible on the opposite side of the light-permeable surface with which the physical object can interact.

8. The method of claim 1, wherein positioning the image capture device that provides direct light communication between the light permeable surface and the image capture device includes positioning the image capture device such that light reflected from the light permeable surface to the camera is not reflected off mirrors and such that such light reflected from the light permeable surface passes only through an infrared band pass filter.

9. A method for reducing an effect of unintended, undesired, and extraneous infrared light signals in a table-top infrared light vision system and without shielding the table-top infrared light vision system from all background infrared sources, the method comprising:

(a) within a table-top infrared light vision system, providing an interactive light permeable surface on which images are projected, the light-permeable surface having a first surface on an internal side of the light-permeable surface, and having a second surface on an opposing external side of the light-permeable surface;

(b) providing a projector and positioning the projector on the internal side of the light-permeable surface;

(c) positioning one or more mirrors on the interior side of the light-permeable surface, the one or more mirrors being positioned so as to reflect light from the projector onto the light-permeable surface;

(d) reflecting light projected from the projector of the one or more mirrors and onto the light-permeable surface to present images visible on the external side of the light-permeable surface;

(e) positioning an infrared video camera on the interior side of the light-permeable surface such that it receives images directly from the light-permeable surface and without being reflected off the one or more mirrors;

(f) positioning a desired infrared light source on the interior side of the light-permeable surface, the infrared light source being screened by a screening device from the video camera so as to substantially prevent any infrared light emitted from the desired infrared light source from entering the camera without first being directed to the light-permeable surface, wherein the desired infrared light source is positioned to emit desired infrared light directly to the light-permeable surface without being reflected off the one or more mirrors and is further positioned to be closer to the light-permeable surface than the screening device and the video camera, which screening device is positioned between the video camera and the desired infrared light source;

(g) selectively activating the desired infrared light source during a first image capture interval, and capturing, with the infrared video camera, a first set of image data for a pixelwise defined portion of the light-permeable surface, the first set of image data including infrared light intensity values of the first set of image data corresponding to background infrared light as well as infrared light emitted from the desired infrared light source through at least a portion of the light-permeable surface;

(h) selectively deactivating the desired infrared light source during a second image capture interval, and capturing, with the infrared video camera, a second set of image data for the pixelwise defined portion of the light-permeable surface, the second set of image data including infrared light intensity values at each pixel for the pixelwise defined portion of the light-permeable surface, the infrared light intensity values of the second set of image data corresponding to the background infrared light and excluding infrared light from the desired infrared light source; and (i) producing a composite set of image data representing one or more physical objects touching the second surface of the light-permeable surface, by subtracting, on a pixel basis, infrared light intensity values of the second set of image data from corresponding infrared light intensity values of the first set of image data, the resulting composite set of image data including only light intensity values resulting from illumination of the one or more physical objects generated by the desired infrared light source.

10. The method of claim 9, wherein:
reflecting light projected from the projector of the one or more mirrors and onto the light-permeable surface to present images visible on the external side of the light-permeable surface includes reflecting light directed from the projector substantially directly toward the light-permeable surface off a first mirror, which first mirror reflects the light further from said light-permeable surface to a second mirror, which second mirror reflects the light onto the light-permeable surface;
the screening device is a baffle; and
producing the resulting composite set of image data is performed without regard to static ambient infrared measurements and/or initial calibration.

* * * * *